3,822,353
METHODS FOR INCREASING DIURESIS
Richard J. Otten, Dresher, Pa., and William H. Reese, Jr., Sterling, Flo Ryer, Falls Church, and Robert J. Weir, Jr., McLean, Va., assignors to Amchem Products, Inc., Ambler, Pa.
No Drawing. Filed Sept. 8, 1972, Ser. No. 287,398
Int. Cl. A61k 27/00
U.S. Cl. 424—222  6 Claims

ABSTRACT OF THE DISCLOSURE

Pharmaceutical compositions containing (2-chloroethyl)phosphonic acid and related compounds are used to effect diuresis and related pharmacological activity.

BACKGROUND OF THE INVENTION

Diuresis is generally defined as an increase in the rate of urine formation. It is caused by copious intake of liquids, by pathological states or by the action of drugs. Drugs producing such an effect are generally referred to as diuretics and the site of their action is generally centered in the kidney, the drug action being an effect on the renal function. The role of the kidneys or renal function is to maintain constancy of the internal environment of the body by eliminating the waste products of metabolism and maintaining a constant volume and composition of the body fluids. The kidney controls and regulates electrolyte concentration in the internal environment, thus directly influencing healthy cellular function. Any marked change in this environment due either to internal or external factors indicates the kidney is not able to fulfill its primary function, which is to regulate electrolyte concentration and acid base balance. As a result, a state of renal disfunction, either glomerular or tubular in origin, or both, exists.

If the glomerular filtration is reduced to a greater extent than the capacity for the tubules to reabsorb sodium chloride in water, there results a relatively higher percentage of absorbed salts to the amount excreted. The increased salt reabsorbed retains with it an osmotic equivalent of water. This renal disease is known as glomerular nephritis and is commonly associated with an abnormal increase in the volume of the extra cellular fluid. This increase will manifest itself as edema. Renal insufficiency can also occur even when there is properly functioning glomerulus, the imbalance leading to increased absorption of salt and water due to the elaboration of mineralocorticoids in the bloodstream. The effect in this case is directly on the tubules.

The resulting shifts in electrolyte imbalance cause edema, leading to congestive heart failure. Diseased tubules can also cause excessive loss or absorption of salt. These glomerular tubular imbalances, in turn, affect the kidney's role in regulating blood flow and maintaining blood pressure, the consequence of which usually is hypertension. Accordingly, when this happens, the cycle must be interrupted somewhere and one method generally employed is to facilitate the removal of the excess water and excess electrolytes from the body. This can be accomplished by the use of diuretic agents. Such diuretic drugs serve to decrease the reabsorption of water, electrolytes, and the low molecular weight organic compounds, into the bloodstream, and, as a consequence, to promote the formation of urine.

Diuretics generally act on the kidney to increase the rate of excretion of water and electrolytes by accelerating the glomerular filtration rate or more effectively by depressing renal tubular reabsorption of these substances. Ordinarily, in the active tubular reabsorption, 98 to 99% of the water of the glomerular filtrate plus electrolytes and organic compounds is reabsorbed through the cell walls of the tubules and back into the bloodstream. Thus, it is apparent that a slight deviation from the normal 98 to 99% tubular reabsorption results in a large increase in urine volume. Generally, it is, therefore, believed that these drugs act somewhere in the tubule; but the particular location acted upon varies with the chemical nature of the drug.

Generally, chemical diuretics have been classified into the following groups:

1. Osmotic and acidotic diuretics
2. Xanthines, pyrimidines, and triazines
3. Organomercurial diuretics
4. Sulfonamides and disulfonamides
5. Thiazides and hydro-thiazides
6. Aldosterone antagonists and inhibitors of aldosterone secretion
7. Alpha beta unsaturated ketone derivatives Each of these are separate and distinct classes of diuretics that have gained significant recognition in the treatment of renal disfunction. The osmotic diuretics are those which mobilize fluid by increasing the osmotic pressure of extra cellular or tubular fluid. Usually, diuresis of this type is evoked by the intravenous administration of hypertonic solutions of electrolytes, such as sodium sulfate, potassium chloride, and potassium nitrate, and of non-electrolytes, such as urea, sucrose, glucose, and mannitol. The aldosterone antagonists are generally steroidal structures. The other broad classes above are already indicated by chemical structure.

DESCRIPTION OF THE INVENTION

Applicants have now discovered a distinctively new class of chemical compounds which exhibit diuretic effects as well as related pharmacological effects and are, therefore, useful in the treatment of a variety of disorders in mammals.

In particular, this invention pertains to the treatment of man or animals with certain phosphonic acid derivatives.

More particularly, it pertains to novel pharmaceutical compositions incorporating such phosphonic acid derivatives and to methods of administering them.

Still more particularly, the novel pharmaceutical compositions and process of this invention pertain to a method of inducing pharmacological action, especially diuretic activity in the treatment of human and animal disorders and to the novel compositions useful therein.

Applicants have now found that certain phosphonic acid derivatives, having the formula as shown below, demonstrate a high degree of diuretic activity. These compounds may be illustrated by the following general formula:

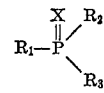

wherein $R_1$ is alkyl or substituted alkyl, i.e. an alkyl group in which one or more hydrogens are replaced by a conventional functional substituent such as hydroxy, amino, halo, cyano, carboxyl, sulfonamido and the like, X is oxygen or sulphur, and $R_2$ and $R_3$ are OH, $NH_2$, SH, OM, OR, or SR where M represents a metal cation and R represents a suitable aliphatic or aromatic group, such that, together with the oxygen or sulphur, there are formed the appropriate or corresponding esters or thioesters or, the R groups can be the same or different or in some cases, they can be taken together to form a cyclic ester, or two molecules of the compound can lose water to form the anhydride, which is also encompassed within the scope of this invention. The aliphatic and aromatic groups contemplated as within the scope of this invention include aliphatic and aromatic moieties having one or more hydrogens replaced by the usual functional groups such as halogen, amino, alkyl, alkoxy, carboxyl, nitro, amido, sulfanamido and the like. The preferred alkyl groups are the straight chain lower alkyls having 1 to 6 carbon atoms. Preferred aromatic groups are the phenyl, benzyl and phenethyl and substituted phenyl, benzyl and phenethyl groups.

The particularly preferred compounds are those having the formula as follows:

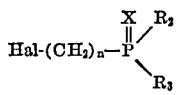

wherein $n$ is 1 to 6, Hal represents halogen, preferably chlorine, X is oxygen or sulphur, preferably oxygen, and $R_2$ and $R_3$ are both OH or both $NH_2$ or one of them is OH and the other is an alkoxy or substituted alkoxy group, preferably $ClCH_2CH_2O$.

Particularly preferred is the compound (2-chloroethyl)phosphonic acid. The compounds employed in the process of this invention are generally known compounds readily available by synthetic methods will known in the art; or in the case of species the preparation of which is not specifically disclosed they can be prepared by analogy to the methods disclosed for closely related analogs. Representative compounds and their preparative methods are disclosed for example, in the following references the disclosures of which are incorporated herein by reference:

U.S. Pats.: 3,548,039; 3,600,475; 3,483,279; 3,455,675; 3,584,014
German Pats.: 1,949,461; 2,010,119; 1,906,675; 2,062,120; 2,062,119; 2,054,138; 2,050,247; 2,032,135; 1,815,999; 964,046; 1,921,504; DT 1,768,617; 1,916,147; 1,950,099; 1,950,100; 1,923,273
U.S.S.R Pats. 210,153; 228,684; 242,890; 226,606
French Pats.: 1,570,559; 1,556,007
Japanese Pat.: 7,213,258
British Pat.: 1,194,433
Belgian Pat.: 756,980

References: Rocz. Chem. 1971, 45(3), 763–8 (Eng.); Can. J. Biochem. 1969, 47(10), 955–60 (Eng.); Tetrahedron Lett. 1970 (15), 1281–4 (Ger.); J. Org. Chem. 1969, 34(6), 1532–9

Among the specific phosphonic acid derivatives answering the above description which are useful for the purposes of this invention, there can be named the following:

(2-chloroethyl)phosphonic acid
(2-bromoethyl)phosphonic acid
(2-fluoroethyl)phosphonic acid
(2-iodoethyl)phosphonic acid
(1-chloroethyl)phosphonic acid
(2-hydroxyethyl)phosphonic acid
(2-aminoethyl)phosphonic acid
methyl phosphonic acid
ethyl phosphonic acid
propyl phosphonic acid
vinyl phosphonic acid
(2-chloroethyl)phosphonic diamide
(2-chloroethyl)phosphonodithioate
(2-chloroethyl)thionophosphonic acid
(2-chloroethyl)trithiophosphonic acid
ethylphosphonic anhydride
(2-chloroethyl)phosphonic anhydride
dimethyl-(2-chloroethyl)phosphonate
diethyl-(2-chloroethyl)phosphonate
bis-(2-chloroethyl)-(2-chloroethyl)phosphonate
(1,2-epoxy propyl)phosphonic acid
cyclopropyl phosphonic acid The diuretic activity of the above compounds, when used in accordance with the method of this invention, has been demonstrated by the results obtained with experimental animals, including mice, rats, and dogs, and with human volunteers.

Fifteen young adult Sprague-Dawley rats were orally administered an average single dose of 1137 mg./kg. of (2-chloroethyl)phosphonic acid. The rats, consisting of five groups, three rats per group, were studied for post-dosage intervals of 2, 12, 24, 48 and 72 hours.

Each of the rats showed a gain in body weight from the beginning of the study until fasting was imposed. They all lost weight during the fasting interval. They all gained weight, when food was again available, from the time the compound was administered until sacrificed. However, the weight gain of the test rats sacrificed at 72 hours post-dosage was only one-half of the weight gain of the control rats (7 grams/100 grams versus 14 grams/100 grams) during the same time period.

The average amount of food consumed by the test animals was 38% less than that consumed by the control rats for the first 24-hour post-dosage interval. Consumption increased to 82% of normal during the 24 to 48 hours post-dosage period. The consumption was further increased to 91% of the normal from 48 to 72 hours post-dosage. The water intake averaged 73% of the normal for the first 24 hours post-dosage and 84% during the following 24-hour period. The intake from 48 to 72 hours post-dosage was 8% greater than normal.

The fecal and urinary excretions of all the rats were normal in color during the entire study. The urine was normal in consistency, however, some of the fecal collections were more moist than normal. The amount of feces excreted average 35% less than normal for the first 24-hour period post-administration. The amount excreted from 24 to 48 hours was normal and from 48 to 72 hours post-dosage was 91% of the normal. There was 25% less than the normal volume of urine excreted for the first 24 hours post-dosage, slightly more than twice the normal volume (210%) excreted from 24 to 48 hours post-dosage and slightly less than twice the normal (183%) from 48 hours to 72 hours post-dosage.

In a two-year feeding study, the test compound was administered orally in the diet. Beagle dogs were used as test animals. The animals were fed a normal diet with water available ad lib. The same animals were used throughout the experiment. After groups of dogs had been in the feeding study for 18 months and 12 months respectively, a daily urine collection program was conducted. Average values for a three-day collection period compared to controls is shown below:

| P.p.m. Ethephon in daily diet | Months fed Ethephon | Collection day 1 | 2 | 3 | Average |
|---|---|---|---|---|---|
| 0 | 18 | 148 ml. | 145 ml. | 124 ml. | 139 ml. |
| 50 | 18 | 173 ml. | 109 ml. | 166 ml. | 149 ml. |
| 6,000 | 18 | 234 ml. | 201 ml. | 210 ml. | 215 ml. |
| 0 | 12 | 109 ml. | 98 ml. | 91 ml. | 99 ml. |
| 25 | 12 | 131 ml. | 137 ml. | 101 ml. | 123 ml. |
| 2,500 | 12 | 162 ml. | 161 ml. | 105 ml. | 143 ml. |

Diuretic activity of (2-chloroethyl)phosphonic acid and its analogues in rats

Screening of six test compounds for diuretic activity was conducted in the rat. The oral administration of (2-chloroethyl)phosphonic bis-amide at 100 mg./kg. caused diuresis. At the 585 mg./kg. dosage level, both (2-chloroethyl)phosphonic bis-amide and (2 - hydroxyethyl)phosphonic acid increased 24 hour urine volumes in rats; a delayed diuresis was produced by (2-bromoethyl)phosphonic acid (at 298 mg./kg.), (2-chloroethyl)phosphonic acid, (2-chloroethyl) (2-chloroethyl)phosphonate (half ester), and ethyl phosphonic acid showed less marked evidence of diuretic activity in the rat at either the low or the high dosage levels.

Materials

The following test compounds were employed:

| Compound | Physical description |
|---|---|
| (2-bromoethyl)phosphonic acid | White crystal. |
| Ethyl phosphonic acid | Do. |
| (2-hydroxyethyl)phosphonic acid | Viscous colorless liquid. |
| (2-chloroethyl)phosphonic bis-amide | Light brown, semisolid substance. |
| (2-chloroethyl)phosphonic acid | White crystal. |
| (2-chloroethyl) (2-chloroethyl)-phosphonate | Viscous colorless liquid. |

The test materials were prepared as 2% weight per volume solutions in saline for low doses and as 11.7% weight per volume for high dosage levels.[1]

Animals

Sprague-Dawley albino male rats (weighing 150 to 250 grams) were used. All rats were individually housed and fed a commercial diet; water was available ad libitum.

Experimental procedure

Two groups of rats, six males per group, were used for the preliminary diuretic screening of each test compound. Each compound was evaluated at a low and high dosage level.

Test solutions and chlorothiazide suspension (in saline) were given by oral intubation and their volumes never exceeded 1.2 ml. per animal. Control rats received saline (1 ml. per rat); those rats which received chlorothiazide served as positive controls. The grouping and treatment schedule is as follows:

| | Dosage schedule | | | |
|---|---|---|---|---|
| | No. of animals | Group 1, low dose, mg./kg. | No. of animals | Group 2, high dose, mg./kg. |
| Saline control | 6 | | 6 | |
| (2-bromoethyl) phosphonic acid | 6 | 100 | 6 | 298 |
| Ethyl phosphonic acid | 6 | 100 | 6 | 585 |
| (2-hydroxyethyl) phosphonic acid | 6 | 100 | 6 | 585 |
| (2-hydroxyethyl) phosphonic bis-amide | 6 | 100 | 6 | 585 |
| (2-chloroethyl) phosphonic acid | 6 | 100 | 6 | 585 |
| (2-chloroethyl) (2-chloroethyl)phosphonate | 6 | 100 | 6 | 585 |
| Chlorothiazide | 6 | 100 | 6 | 585 |

[1] High dosage level of (2-bromoethyl)phosphonic acid was prepared as a 6% weight per volume solution in saline.

Following dosing, all animals were individually housed in metabolism cages. Food was withheld from all animals for a period of 72 hours; water was available ad libitum. Urine was collected and volumes measured at 24, 48, and 72 hours. At the end of the 72-hour experimental period, urine collected at 24, 48, and 72 hours from individual animals was combined and then frozen for future determinations of electrolytes. For purposes of data analysis, a value of urine volume of an individual animal was rejected if it was three times greater or one third less than the group mean. The criteria of diuresis is the ratio of the mean urine volume of the test group to the saline group. A value greater or equal to 1.20 is considered positive for diuretic activity.

Observations of toxic signs and mortality were made at 24, 48, and 72 hours following treatment.

Results

The data on the urine output in rats following the administration of six test compounds at 100 mg./kg. are presented in Table No. 1. Oral administration of (2-chloroethyl)phosphonic bis-amide and chlorothiazide increased urine volume above the control level at 24 hours. (2-chloroethyl)phosphonic bis-amide maintained high urine output at 48 hours.

At the high dosage level, five test compounds caused an elevation of urine volume in rats during the 72-hour experimental period. At 585 mg./kg., (2-hydroxyethyl) phosphonic acid, (2-chloroethyl)phosphonic bis-amide and chlorothiazide increased urine volume above the control value at 24 hours (see Table No. 2). At 48 hours, increases in urine volume above the control value occurred in rats following the administration of (2-bromoethyl)phosphonic acid (at 298 mg./kg.), (2-hydroxyethyl)phosphonic acid, (2-chloroethyl)phosphonic bis-amide, (2-chloroethyl)phosphonic acid, (2-chloroethyl)-(2-chloroethyl)phosphonate (half ester) and chlorothiazide; the remaining compound, ethyl phosphonic acid, had a lesser indication of diuretic effect. High urine output was observed in the (2-chloroethyl)phosphonic acid treated rats at 72 hours. There were no significant toxic signs observed in animals receiving either low or high dosage of the test compounds; however, one death each occurred in the chlorothiazide treated groups at the high dosage level.

TABLE NO. 1

[Average urine volume in the rat following oral administration of (2-chloroethyl)phosphonic acid and its analogues (100 mg./kg.)]

| | 24 hours | | | 48 hours | | | 72 hours | | |
|---|---|---|---|---|---|---|---|---|---|
| Compound | Vol., mil. | Range, mil. | Ratio | Vol., mil. | Range, mil. | Ratio | Vol., mil. | Range, mil. | Ratio |
| Saline control | 21.1 *(6) | 15.0–27.6 | | 220.1 (6) | 14.0–26.0 | | 12.8 (6) | 8.4–21.0 | |
| (2-bromoethyl)phosphonic acid | 17.2 (6) | 7.0–24.4 | <1 | 11.0 (5) | 4.0–23.0 | <1 | 7.8 (6) | 4.0–14.4 | <1 |
| Ethyl phosphonic acid | 17.5 (5) | 11.5–30.5 | <1 | 10.0 (5) | 4.0–20.0 | <1 | 8.1 (5) | 3.2–18.4 | <1 |
| (2-hydroxyethyl)phosphonic acid (87%) | 14.2 (6) | 7.4–20.0 | <1 | 12.5 (6) | 5.0–23.5 | <1 | 15.1 (5) | 8.0–35.0 | 1.18 |
| (2-chloroethyl)phosphonic bis-amide | 28.3 (4) | 13.0–34.0 | 1.34 | 24.1 (4) | 19.0–27.5 | 1.20 | 14.4 (4) | 9.0–20.2 | 1.12 |
| (2-chloroethyl)phosphonic acid | 17.1 (6) | 6.0–26.0 | <1 | 10.3 (5) | 5.8–18.0 | <1 | 5.0 (6) | 2.4–8.4 | <1 |
| (2-chloroethyl)-(2-chloroethyl)phosphonate | 10.8 (6) | 7.4–15.0 | <1 | 8.8 (6) | 4.5–12.0 | <1 | 4.8 (6) | 3.2–5.8 | <1 |
| Chlorothiazide | 27.2 (6) | 12.0–48.0 | 1.29 | 20.0 (5) | 17.0–23.0 | <1 | 12.9 (5) | 8.2–17.0 | 1.01 |

*Number of animals used in calculations indicated in parenthesis.

TABLE NO. 2

[Average urine output in the rat following oral administration of (2-chloroethyl) phosphonic acid and its analogues (585 mg./kg.)]

| Compound | 24 hours | | | 48 hours | | | 72 hours | | |
|---|---|---|---|---|---|---|---|---|---|
| | Vol., mil. | Range, mil. | Ratio | Vol., mil. | Range, mil. | Ratio | Vol., mil. | Range, mil. | Ratio |
| Saline control | 14.7 *(6) | 6.2-24.8 | | 6.5 (5) | 4.0-19.0 | | 4.3 (4) | 3.2-5.4 | |
| (2-bromoethyl)phosphonic acid (298 mg./kg.) | 16.1 (5) | 9.2 24.0 | 1.1 | 9.9 (5) | 5.0-14.0 | 1.53 | 4.6 (5) | 2.0-8.5 | 1.07 |
| Ethyl phosphonic acid | 15.7 (6) | 10.4-24.0 | 1.06 | 7.4 (6) | 3.0-11.6 | 1.14 | 3.5 (6) | 2.0-5.6 | <1 |
| (2-hydroxyethyl)phosphonic acid (87%) | 18.5 (5) | 13.4-23.2 | 1.26 | 8.2 (4) | 6.6-12.4 | 1.24 | 4.8 (3) | 3.6-7.0 | 1.12 |
| (2-chloroethyl)phosphonic bis-amide | 26.9 (6) | 16.6-37.4 | 1.83 | 9.8 (6) | 5.0-15.6 | 1.51 | 3.0 (6) | 1.5-4.7 | <1 |
| (2-chloroethyl)phosphonic acid | 14.2 (6) | 8.0-20.5 | <1 | 9.6 (6) | 3.5-26.4 | 1.48 | 5.2 (6) | 2.4-13.0 | 1.20 |
| (2-chloroethyl)-(2-chloroethyl)phosphonate | 12.1 (6) | 10.5-13.4 | <1 | 11.1 (6) | 5.0-32.4 | 1.71 | 3.8 (6) | 2.3-6.2 | <1 |
| Chlorothiazide | 16.9 (5) | 12.0-24.2 | 1.26 | 9.0 | 3.4-13.0 | 1.38 | 4.1 (5) | 1.4-6.0 | <1 |

*Number of animals used in calculations indicated in parenthesis.

Evaluation of urine output following acute intravenous administration in six dogs was carried out on several test compounds. Six dogs were selected for each study from a large colony of animals. Those dogs with consistent urine output (generally less than 10% variation) were grouped for each study. The test compound was administered in a single injection intravenously into the foreleg. The dogs were housed in individual stainless steel metabolism cages with total urine output collected in pans. Urine was collected each 24 hour period for two to three days following injection. The results are shown below:

(2-chloroethyl)phosphonic acid:
  Compound prep: 200 mg./ml. solubilized in propylene glycol q.s. with sterile physiological saline
  Dose: 100 mg./kg. injected slowly. First animal injected observed for 15 minutes prior to injecting remaining five animals

| | Wt. (kg.) | Urine volumes (cc.) | | | | |
|---|---|---|---|---|---|---|
| | | Control | | Experimental | | |
| | | 24 hr. | 48 hr. | 24 hr. | 48 hr. | 72 hr. |
| Animal number: | | | | | | |
| 1 | 8.0 | 60 | 59 | 649 | 86 | 73 |
| 2 | 11.4 | 122 | 115 | 460 | 75 | 112 |
| 3 | 11.6 | 342 | 338 | 325 | 121 | 251 |
| 4 | 8.4 | 200 | 185 | 486 | 129 | 200 |
| 5 | 8.0 | 112 | 114 | *1,097 | 225 | 210 |
| 6 | 10.2 | 133 | 110 | *1,058 | 490 | 327 |
| Total volume | | 949 | 921 | 4,075 | 1,126 | 1,173 |
| Mean | | 158 | 154 | 679 | 188 | 196 |
| Percent change from mean. | | (156) | | 335 | 20.5 | 25.6 |

* Collecting pan overflowed.

Remarks: 1. All animals exhibited increased thirst and vomited first day.

REPEAT STUDY AT 25 MG./KG.

| | Wt. (kg.) | Urine volume (cc.) 24 hr. | | | | |
|---|---|---|---|---|---|---|
| | | Control | | | Experimental | |
| | | 24 hr. | 48 hr. | 72 hr. | 24 hr. | 48 hr. |
| Animal number: | | | | | | |
| 1 | 12.0 | 206 | 205 | 225 | 95 | 252 |
| 2 | 6.2 | 97 | 122 | 102 | 103 | 111 |
| 3 | 12.0 | 173 | 100 | 178 | 224 | 52 |
| 4 | 8.0 | 94 | 134 | 147 | 128 | 139 |
| 5 | 11.0 | 203 | 167 | 143 | 293 | 369 |
| 6 | 11.2 | 345 | 258 | 312 | 301 | 274 |
| Total volume | | 1,118 | 986 | 1,107 | 1,144 | 1,147 |
| Mean | | 186 | 164 | 184 | 191 | |
| Percent change from mean. | | (178) | | | 7.3 | |

2-chloroethyl ester of (2-chloroethyl)phosphonic acid:
  Compound preparation: 100 mg./ml. dissolved in propylene glycol q.s.i. sterile physiologic saline
  Dose: 100 mg./kg. injected slowly observed first animal 15 minutes prior to injecting remainder

| | Wt. (kg.) | Urine volume, cc./24 hours | | | | |
|---|---|---|---|---|---|---|
| | | Control | | Experimental | | |
| | | 24 hr. | 48 hr. | 24 hr. | 48 hr. | 72 hr. |
| Animal number: | | | | | | |
| 1 | 8.3 | 114 | 130 | 635 | 89 | 65 |
| 2 | 8.4 | 84 | 89 | 128 | 140 | 90 |
| 3 | 6.2 | 61 | 73 | 30 | 4 | 17 |
| 4 | 10.0 | 300 | 331 | 425 | 157 | 144 |
| 5 | 8.0 | 150 | 156 | 169 | 120 | 133 |
| | 8.4 | 140 | 149 | *406 | 92 | 196 |
| Total volume | | 849 | 928 | 1,793 | 602 | 645 |
| Mean | | 142 | 155 | 299 | 100 | 108 |
| Percent change from mean. | | (149) | | 101 | | |

*Animal vomited.

COMBINED STUDY CROSSOVER (2-chloroethyl) phosphondiamine—chlorothiazide

Compound preparation: (2-chloroethyl)phosphondiamine 200 mg./ml solubilized in propylene glycol q.s. with sterile physiological saline
Dose: 5 mg./kg. First animal in each experimental group injected and observed 15 minutes prior to injecting remaining animals (2-CHLOROETHYL) PHOSPHONDIAMINE—50 MG./KG.

| | Wt. (kg.) | Urine volume, cc./24 hours | | | |
|---|---|---|---|---|---|
| | | Control, 24 hr. | Experimental | | |
| | | | 24 hr. | 48 hr. | 72 hr. |
| Animal number: | | | | | |
| 1 | 7.9 | 114 | 200 | 164 | 274 |
| 2 | 11.0 | 488 | 446 | 500 | 634 |
| 3 | 10.0 | 78 | 104 | 84 | 184 |
| 4 | 9.0 | 110 | 106 | 130 | 144 |
| 5 | 10.0 | 140 | 212 | 150 | 156 |
| 6 | 8.0 | 130 | 118 | 158 | 98 |
| Total volume | | 1,060 | 1,186 | 1,186 | 1,391 |
| Mean | | 177 | 198 | 198 | 278 |
| Percent change from mean. | | | 45 | 45 | 57 |

CHLOROTHIAZIDE—5 MG./KG.

| | Wt. (kg.) | Urine volume, cc./24 hours | | | |
|---|---|---|---|---|---|
| | | Control, 24 hr. | Experimental | | |
| | | | 24 hr. | 48 hr. | 72 hr. |
| Animal number: | | | | | |
| 1 | 9.4 | 108 | 360 | 182 | 260 |
| 2 | 10.0 | 248 | 236 | 134 | 208 |
| 3 | 12.0 | 68 | 116 | 55 | 58 |
| 4 | 10.0 | 140 | 234 | 250 | 160 |
| 5 | 9.0 | 390 | 418 | 360 | 425 |
| 6 | 10.6 | 180 | 145 | 110 | 126 |
| Total volume | | 1,134 | 1,509 | 1,091 | 1,237 |
| Mean | | 189 | 252 | 182 | 206 |
| Percent change from mean. | | | 33 | | 9 |

CHLOROTHIAZIDE—5 MG./KG.

| Animal number: | Wt. (kg.) | Control, 24 hr. | Experimental | | | |
|---|---|---|---|---|---|---|
| | | | 24 hr. | 48 hr. | 72 hr. | 96 hr. |
| 1 | 7.9 | 132 | 230 | 36 | 120 | 102 |
| 2 | 11.0 | 124 | 630 | 260 | 435 | 402 |
| 3 | 10.0 | 90 | 186 | 33 | 71 | 150 |
| 4 | 9.0 | 250 | 208 | 73 | 121 | 116 |
| 5 | 10.0 | 106 | 206 | 55 | 106 | 107 |
| 6 | 8.0 | 70 | 176 | 88 | 71 | 70 |
| Total volume | | 772 | 1,636 | 545 | 924 | 947 |
| Mean | | 129 | 273 | 91 | 154 | 158 |
| Percent change from mean | | | 112 | | 19 | 22 |

(2-CHLOROETHYL)PHOSPHONDIAMINE—50 MG./KG.

| Animal number: | Wt. (kg.) | Control, 24 hr. | Experimental | | | |
|---|---|---|---|---|---|---|
| | | | 24 hr. | 48 hr. | 72 hr. | 96 hr. |
| 1 | 12.0 | 470 | 400 | 197 | 234 | 232 |
| 2 | 10.2 | 254 | 94 | 71 | 114 | 125 |
| 3 | 11.2 | 136 | 134 | 76 | 103 | 122 |
| 4 | 9.2 | 114 | 102 | 116 | 90 | 129 |
| 5 | 10.3 | 250 | 450 | 12 | 324 | 131 |
| 6 | 8.6 | 88 | 88 | 74 | 92 | 82 |
| Total vol | | 1,312 | 1,268 | 546 | 962 | 1,020 |
| Mean | | 219 | 211 | 91 | 160 | 170 |
| Percent change from mean | | | | | | |

METHODS

A peliminary dose range study was carried out in two human subjects. Based on the results of this investigation, a study was carried out in a larger group of subjects to evalute the effect of repeated daily doses of the material when given orally for 28 consecutive days.

Selection of subjects

Sixteen human volunteers, judged to be in good health as ascertained by prephysical interview, physical examination and selected clinical laboratory evaluations were chosen for the study.

All subjects were thoroughly briefed on the nature and present use of the test product, the animal toxicity data, and the potential pharmacological side effects.

The 16 subjects (eight males and eight females) were divided into groups; six (three males and three females) served as the controls and received a placebo.[2] Ten (five males and five females) received the test material.

Assignment to either the control or test group was by a random number sequence.

Compound preparation

Test material or placebo was prepared daily in No. 2 clear gelatin capsules. The test material was kept at 4° C. between preparations. Periodically, throughout the course of the study, a sample of the test material from the stock batch was assayed to be certain that there was no change in potency.

Compound administration—Observations

Administration of the test material or a placebo was orally by capsule given in a divided daily dose. Each subject received two capsules postprandially for the first two dosing periods; the third dose (two capsules) was given at the end of the work day.

The capsules were dispensed daily (five days/week) by an assistant who observed the subjects while they took

[2] Placebo consisted of cornstarch (Argo brand).

each capsule and recorded solicited comments related to ingestion of the test material. Neither the assistant nor the subjects were aware of which capsules contained active ingredients or placebo.

Each subject received a supply of capsules on Friday of each week to be taken during the two-day weekend in order that the administration of material would be continuous.

All subjects were monitored constantly during the first eight hours following ingestion of the test material for adverse effects or symptoms related to compound administration and once daily thereafter.

In addition, the clinical laboratory studies were performed on all subjects twice initially and on Day 7, 14, 21, and 28 of the study and two weeks following the last dose of compound.

RESULTS

During the course of the study, the average daily dose of test material ingested (as active compound) was approximately 124.0 mg.; doses ranged from 116.8 to 133.9 mg.

No compound effect, with regard to physical appearance or behavior, was evident throughout the study.

Five subjects (four control, one test) remained asymptomatic throughout the course of the study.

Urgency or an increased frequency of urination was experienced during the course of the study by six subjects (five receiving test compound).

Further evaluation of compound effect in humans following repeated daily doses was carried out in two volunteers (#1, wt. 102 kg.; #2, wt. 90 kg.) judged to be in good health by history and physical evaluation.

The test material was prepared as a w./v. solution in propylene glycol U.S.P.

The test material was given orally, by capsule, in three divided doses—one immediately following each meal. Capsules (No. 2 gelatin) were prepared daily prior to ingestion.

Subjects were observed daily and comments were solicited to ascertain any possible adverse effects.

Clinical laboratory studies included hematology evaluations of Hematocrit, hemoglobin, erythrocyte count, cell indices, total and differential leucocyte count and clinical chemistry evaluations of Bilirubin total and direct, blood urea nitrogen, creatinine, blood sugar, protein bound iodine, total protein and A/G ratio, alkaline phosphatase, transaminases (SGOT, SGPT), uric acid, prothrombin time and serum electrolytes (sodium, potassium, chloride, $CO_2$ content) and cholinesterase determinations. Urinalysis evaluations included specific gravity, pH, protein, glucose, ketones, hemoglobin, and microscopic examination of sediment. No adverse effects were indicated.

RESULTS

During the course of the study, the dose of test material ingested ranged from 5.4 mg./day to 120 mg./day total daily dose. No compound effect with regard to physical appearance or behavior was evident throughout the study. On day three, both subjects expressed a subjective sensation of urinary urgency and increased urination. This symptom tended to subside during the course of the study. One subject maintained a urine specific gravity slightly lower than the control value throughout the experimental period. All other values on urinalysis were within normal limits as were values for hematology.

This invention also pertains to a composition embodiment whereby there are provided pharmaceutical compositions in unit dosage form containing as active ingredient a phosphonic acid derivative of the type described herein and particularly the compound (2-chloroethyl)phosphonic acid in an amount effective to increase diuresis in mammals, but in an amount below that which causes any significant adverse side effects in the gastrointestinal tract. The pharmaceutical compositions of this invention are generally comprised of one or more of the active phosphonic acid derivatives, as described above, and a suitable pharmaceutical carrier. Ordinarily, such compositions will contain from 1 to 1000 mgs. of active ingredient and may be administered according to the particular need, preferably 1 to 3 times a day, although other daily dose regimens, including different amounts or rates for different conditions, can be employed as directed by a physician. In preparing the pharmaceutical formulation for administration, one can prepare either formulations suitable for oral or parenteral administration, that is, tablets, capsules, solutions, suspensions, and the like for oral administration and single or multiple dose vials, sterile cartridges, or other injectable forms for intravenous, intramuscular, or subcutaneous administration. Ordinarily, there can be used in the formulation about 10 to about 90% of the active ingredient together with conventional pharmaceutical excipients. Orally applicable compositions, such as tablets, pills or capsules, may be compounded to contain about 1 to 1000 mg. Especially valuable are compositions that contain per-oral unit doses of about 25 to 200 mgs. The formation of the compositions is carried out in the manner normally employed in the art, usually by combining the active ingredient with pharmaceutically acceptable inorganic or organic excipients suitable especially for enteral administration. These include carriers, binders, fillers, lubricants, stabilizers, preservants, wetting agents, solution promoters or retarders, salts for regulating the osmotic pressure, buffers, colors, and the like. Examples of such carrier materials are starches, for example, cornstarch, wheatstarch, arrowroot starch, and the like; sugars, for example, lactose, sucrose, and the like; stearic acid or salts thereof, for example, magnesium stearate, calcium stearate, and the like; aluminum magnesium silicate preparations (colloidal silica preparations), basic aluminum salts, for example, aluminum dihydroxyalantoinate, acacia, polyethylene glycol, and the like. The quantities of these ingredients vary widely and depend upon the physical characteristics, for example, softness and the like, and size of the orally applicable composition, the method of its manufacture and the like. Capsulation may also be effected using, if necessary, the same excipients as those employed for the manufacture of the tablets. Any compatible color approved and certified under the provisions of the Federal Food, Drug and Cosmetic Law may be used as a means of identification, and the like. The tablet, capsule, or pill for oral use may be enterically coated, and such coating is effected in the standard manner, using standard enteric coating agents. Thus, agents such as gelatin alone or hardened with formaldehyde, cellulose esters and either shellac, fats or fatty acids containing a disintegrating solid, such as magnesium oxide, or other standard enteric coating materials may be used. Slow-release coatings may be employed, if desired, using higher amounts of active ingredient or other slow-release forms of capsulation and tableting may also be employed. Other active ingredients for combined therapy may also be incorporated into a single tablet with the active ingredients of this invention. Compositions can be made to provide for a prolonged and sustained effect, for example, by tableting in the manner described in U.S. Pat. No. 2,887,738, having the active ingredient embedded in pharmaceutically acceptable waxy core for prolonged absorption in the lower intestine, around which is compressed a granulated mixture of the active ingredient together with a pharmaceutically acceptable carrier for immediate absorption in the stomach, or capsules having prolonged effects may contain micro-pills containing small amounts of the pharmacologically active ingredient with coats of different rates of degradation. These long-acting preparations are prepared according to well known methods. Suitable formulations for parenteral administration can also be prepared according to methods well known to the art.

These compounds are useful in numerous clinical conditions with the one common denominator, that is, retention by the body of excessive water and electrolytes. The compounds are also useful in veterinary medicine for example in treating nephritis or congestive heart failure in dogs. It is not known particularly how the compounds of this invention act to achieve their diuretic effect, but they can be used in relief of such conditions as congestive heart disorders, for example, in the treatment of cardiac patients, as anti-hypertensive agents, for certain conditions of toxemia, for example; toxemia as in pregnancy, compounds can be used to flush the kidneys, they can be used for hormone imbalances, for renal problems and failures, such as nephrosis. Generally, however, it is preferred to employ the compounds of this invention in compositions suitable for oral administration. These compounds can be used in all types of edema, such as that of congestive heart failure, renal or kidney disease, as an adjunct to anti-hypertensive drugs to prevent the development of toxemia or in the control of hypertension in pregnancy and in the treatment of toxemia.

As noted above, the method of administering the compositions of this invention generally doesn't depart from conventional methods of administering diuretics with oral administration being preferred. The usual adult dosage is between .1 and 1 gram once or twice a day, the effect lasting for as long as 72 hours. Accordingly, administration on alternate days or every third day or even 3 to 5-day intervals can be utilized. A dose regimen can be established to get maximum benefit in consistent response, avoiding excessive response and resulting undesirable imbalances. The compounds of this invention are relatively non-toxic and have shown no significant adverse side effects when used at the doses recommended for diuretic effects.

The use of (2-chloroethyl)phosphonic acid and analogs as described above can provide an important method of achieving diuresis when employed alone or in combination with other of the phosphonic acid derivatives or with other diuretics such as the thiazides. Generally, use of the phosphonic acid diuretics of this invention will be indicated where increased urinary excretion is desirable. The dose required to eliminate retained fluids will depend upon the particular active compound chosen and the route of administration. With (2-chloroethyl)phosphonic acid, for example, an oral dose of 5 mg./kg. of body weight has been indicated as sufficient to stimulate urinary output in humans. Generally, the total daily dose required will be between about 5 mg. and 1500 mg. Lower doses are expected to produce the same results when administered parenterally. Individualization of the dose to permit maintenance of dry weight with minimal disturbance of electrolyte balance will be determined by the condition and response of each patient. While these compounds appear to be relatively nontoxic in mammalian systems, the diuretic method of this invention will be best accomplished in each case by use of the smallest effective dose which best maintains the dry or normal weight of the patient. Depending on the particular compound, some diminution of activity may result from prolonged administration though generally adaptability is not a problem and test results with (2-chloroethyl)phosphonic acid indicate no significant reduction in activity after eighteen months of continuous daily dosing orally in dogs at dosages varying between 50 and 6000 p.p.m. in the diet. In dogs, the (2-chloroethyl)phosphonic acid could not be administered in a lethal dose owing to almost immediate vomiting at high doses as shown by the following results:

Procedure: The test compound was administered orally in capsule form in a single dose. Beagle dogs were used as test subjects, three animals of each sex. These six animals were dosed at a constant level ratio of 1.5, starting at 50 mg./kg. as the low level. The same animals were used throughout the experiment with a one-week recovery period between dosing. Each animal was fasted 18 hours prior to dosing.

RESULTS

Dosage 150 mg./kg.—All vomited within ½ hour. Recovered within 1 hour.
100 mg./kg.—All vomited within ½ hour. Recovered within 1 hour.
75 mg./kg.—2 animals vomited within ½ hour. Recovered within 1 hour.
50 mg./kg.—No animals vomited.

No autopsy was performed on these animals and no other signs of intoxication were observed.

Vomiting was also observed at lower doses administered intravenously, indicating that the phosphonic acid derivatives of this invention and particularly the (2-chloroethyl) phosphonic acid are useful as emetic agents at doses higher than those generally required for diuresis.

We claim:

1. A method of increasing diuresis in mammals which comprises administering an effective amount of a compound of the formula:

wherein X is oxygen or sulfur, $R_1$ is alkyl of 1 to 6 carbon atoms, halo-alkyl of 1 to 6 carbon atoms, hydroxy alkyl of 1 to 6 carbon atoms, or amino-alkyl of 1 to 6 carbon atoms and $R_2$ and $R_3$ are each independently selected from the group consisting of OH, $NH_2$, SH, alkoxy of 1 to 6 carbon atoms and haloalkoxy of 1 to 6 carbon atoms or $R_2$ is OH and $R_3$ is alkoxy of 1 to 6 carbon atoms or haloalkoxy of 1 to 6 carbon atoms.

2. A method of increasing diuresis in mammals which comprises administering an effective amount of a compound of the formula:

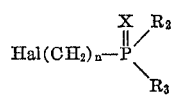

wherein Hal represents chloro or bromo, X is oxygen or sulfur and $R_2$ and $R_3$ represent OH, $NH_2$, alkoxy of 1 to 6 carbon atoms or haloalkoxy of 1 to 6 carbon atoms and $n$ is an integer from 1 to 6.

3. A method of increasing diuresis in mammals which comprises administering an effective amount of a compound of the formula:

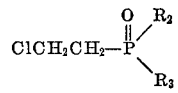

wherein $R_2$ and $R_3$ are OH or $NH_2$.

4. A method of increasing diuresis which comprises administering an effective amount of (2-chloroethyl)phosphonic acid.

5. The method of claim 4 wherein the (2-chloroethyl) phosphonic acid is administered orally.

6. The method of claim 4 wherein the (2-chloroethyl) phosphonic acid is administered parenterally.

References Cited

UNITED STATES PATENTS 3,117,057   1/1964   Snyder _____ 71—79

OTHER REFERENCES

Sterry: Chem. Abst., vol. 73 (1970), pp. 108, 559k.

SAM ROSEN, Primary Examiner

U.S. Cl. X.R.
424—220